Nov. 1, 1955    A. J. LEMBERGER    2,722,080
FISH HOOK DISLODGER
Filed Sept. 28, 1953

INVENTOR.
ANTON J. LEMBERGER
BY
Gerald P. Welch
ATTORNEY

United States Patent Office 2,722,080
Patented Nov. 1, 1955

2,722,080
FISH HOOK DISLODGER

Anton J. Lemberger, Whitelaw, Wis.

Application September 28, 1953, Serial No. 382,680

2 Claims. (Cl. 43—53.5)

This invention relates to improvements in fish hook dislodgers, and more particularly to a novel fish hook dislodger of the cocked spring type.

An object of the invention is to provide a device of the type which will provide a handle member enclosing a coiled spring and cocking means for the spring operable to force a piston tube against a circular ejector threadedly engaging an embedded hook.

Other and further objects of the invention will appear as the description proceeds, reference being had to the accompanying drawing, in which.

Figure 1:
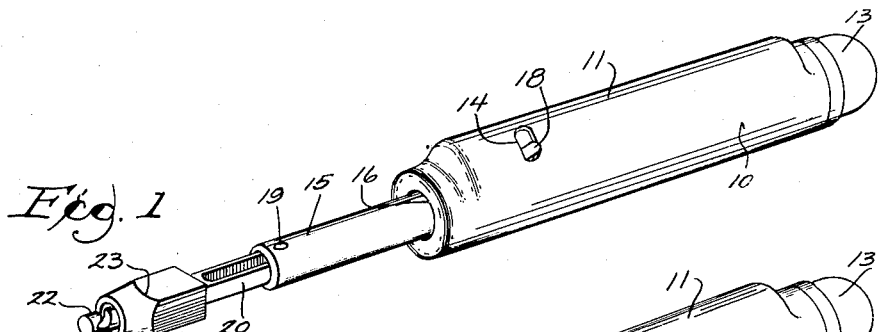
Fig. 1 is a view in perspective of the fish hook dislodger with the spring in cocked position.
Figure 2:
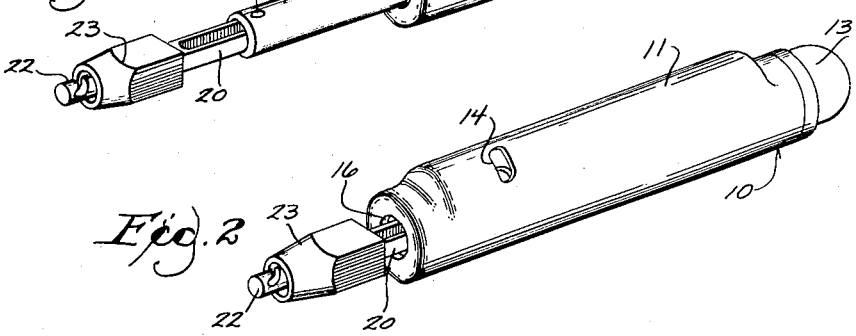
Fig. 2 is a similar view of the device with the piston retracted.
Figure 3:
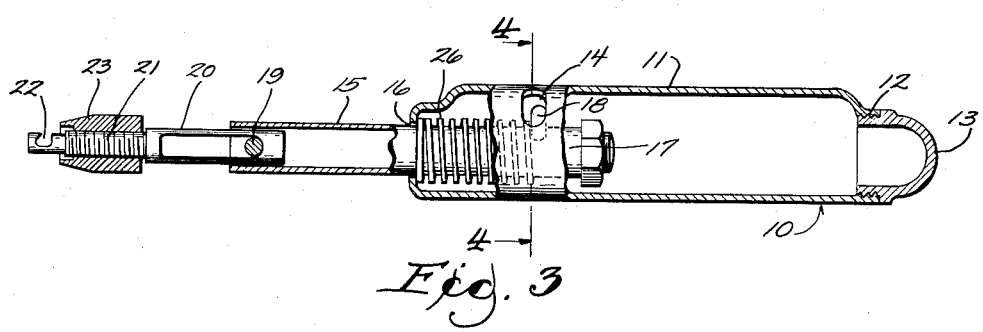
Fig. 3 is a partial sectional view showing the piston extended and the spring in cocked position.
Figure 4:
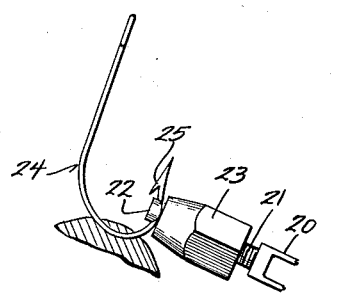
Fig. 4 is a transverse section of the device shown in Fig. 2 taken at approximately the center of the slot 14 and looking upwardly and to the right.
Figure 5:
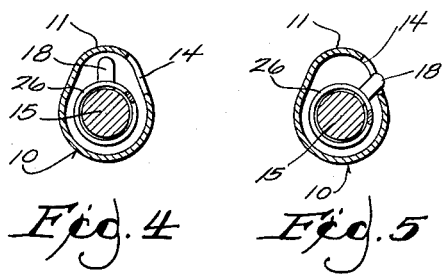
Fig. 5 is a transverse section taken on the line 4—4 of Fig. 3.
Figure 6:
Fig. 6 is a fragmentary view of the device applied to a fish hook.

Referring more particularly to the drawings, the numeral 10 refers to the device generally comprising a handle casing having a laterally disposed longitudinally extending enlargement 11. One end thereof is provided with a circular threaded opening at 12, to accommodate a hollow exteriorly threaded plug 13. The enlargement 11 has a transversely elongated aperture at 14 thereof. A tubular piston 15 is slidably mounted in an opening 16 at the other end of the handle casing 10 from said plug and is provided adjacent the inner end thereof 17 with a protruding pin 18. A coil expansion spring is carried on the piston 15 between a shoulder inwardly adjacent to the opening 16 and the pin 18. A transverse internal pin 19 is fitted within the piston 15 adjacent the outer end thereof and carries the link member 20 which latter has the integral threaded portion 21 provided at its outer end with the jaw 22. An internally threaded tapered head 23 is engaged on the threaded portion 21 and may be threadingly adjusted toward or away from the jaw 22.

In use, the jaw 22 is engaged on the hook 24 as close to the barb 25 as possible, and the tapered head 23 is revolved to turn it down against the hook 24. The handle is pulled outwardly, drawing the pin 18 along the enlargement 11 to the aperture at 14. The handle 10 is then turned so that the pin 18 will protrude through and will lodge in the aperture 14. The coil spring 26 is then in compressed position and the device is cocked. To release the dislodger, the handle 10 is turned slightly to release the pin 18 from the aperture 14, whereupon the spring 26 will pull the handle toward the hook at a high rate of speed, causing the link 20 to retract within the handle which latter strikes the head 23 a relatively heavy blow to dislodge the hook.

It will be understood that the device is capable of many modifications in structure and design, without departing from the spirit of the invention, within the scope of the appended claims.

Having thus described the invention, what is claimed and desired to be secured by Letters Patent of the United States, is:

1. A fishhook dislodger comprising a hollow handle member having a laterally disposed longitudinally extending enlargement thereon, a tubular piston slidable through one end of the handle and having one end extending outwardly thereof, a pin protruding at right angles laterally from said piston, said handle member having a slot having its longitudinal axis perpendicular to the longitudinal axis of said piston adapted to receive said pin which is axially movable within said handle enlargement, a coil spring on said piston, a link connected to the end of the piston exteriorly of said handle, said link having a threaded portion, a tapered head having a recess in one threaded end on the link, and said link having a jaw for holding a fishhook in the recessed end of said threaded portion.

2. A fishhook dislodger comprising a hollow handle member having a laterally disposed longitudinally extending enlargement, a tubular piston having a free end portion slidable through one end of the handle, a coil spring embracing said piston, a pin on said piston, said handle member having an aperture adapted to receive the pin, a link connected to the free end of said piston, said link having a threaded portion on the outer end thereof said link, a tapered head threaded thereon, and the outer end of said threaded portion having a laterally open jaw adapted to receive an embedded fishhook.

References Cited in the file of this patent

UNITED STATES PATENTS

| | | |
|---|---|---|
| 726,086 | McAlpine | Apr. 21, 1903 |
| 1,597,472 | Keeler | Aug. 24, 1926 |
| 1,803,560 | Rodin | May 5, 1931 |
| 1,803,561 | Rodin | May 5, 1931 |
| 2,289,810 | Tallmadge | July 14, 1942 |
| 2,455,013 | Klinicki | Nov. 3, 1948 |
| 2,541,782 | Rodin | Feb. 13, 1951 |